US 11,908,621 B2

(12) United States Patent
Kinemura (10) Patent No.: US 11,908,621 B2
(45) Date of Patent: Feb. 20, 2024

(54) INDUCTIVE-LOAD CONTROL CIRCUIT

(71) Applicant: Alps Alpine Co., Ltd., Tokyo (JP)

(72) Inventor: Kazuhiko Kinemura, Miyagi (JP)

(73) Assignee: Alps Alpine Co., Ltd. (JP)

( * ) Notice: Subject to any disclaimer, the term of this patent is extended or adjusted under 35 U.S.C. 154(b) by 453 days.

(21) Appl. No.: 17/175,759

(22) Filed: Feb. 15, 2021

(65) Prior Publication Data

US 2021/0296037 A1 Sep. 23, 2021

(30) Foreign Application Priority Data

Mar. 17, 2020 (JP) .................... 2020-046528

(51) Int. Cl.
*H01F 7/18* (2006.01)
*H01F 7/06* (2006.01)
(Continued)

(52) U.S. Cl.
CPC ............. *H01F 7/1844* (2013.01); *G01K 7/24* (2013.01); *H01C 7/008* (2013.01); *H01F 7/064* (2013.01); *F16D 63/002* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575;
H02M 5/2573; H02M 1/081; H02M 5/293; H02M 7/12; H02M 3/10; H02M 3/125; H02M 3/13; H02M 3/135;
(Continued)

(56) References Cited

U.S. PATENT DOCUMENTS 7,737,580 B2 * 6/2010 Hjort .................... H02J 7/0048
307/64
10,291,235 B2 * 5/2019 Arai .......................... H03L 1/02
11,264,889 B2 * 3/2022 Takahashi ............... H02M 1/08

FOREIGN PATENT DOCUMENTS

JP 2009-089451 A 4/2009

* cited by examiner

*Primary Examiner* — Jeffrey A Gblende
(74) *Attorney, Agent, or Firm* — Harness, Dickey & Pierce, P.L.C.

(57) ABSTRACT

An inductive-load control circuit includes a circuit board on or in which a controller and a driving circuit are disposed, an inductive load disposed at a location apart from the circuit board and connected to the driving circuit of the circuit board, a detection resistor group included in the driving circuit and connected in series with the inductive load, and a temperature measuring element. The detection resistor group includes resistors. The temperature measuring element is disposed between the resistors. The controller and the driving circuit are supplied with electric power by a power supply. The driving circuit controls the electric power supplied by the power supply and applies the electric power to the inductive load. The circuit board has a signal ground connected to the controller and a power ground connected to the detection resistor group of the driving circuit. The temperature measuring element is connected to the power ground.

14 Claims, 5 Drawing Sheets

(51) Int. Cl.
   *G01K 7/24*     (2006.01)
   *H01C 7/00*     (2006.01)
   *F16D 63/00*    (2006.01)

(58) Field of Classification Search
   CPC ........ H02M 3/145; H02M 3/15; H02M 3/155;
         H02M 3/156; H02M 3/157; H02M 3/158;
         H02M 1/346; H02M 3/1588; H02M
         2003/1566; H02M 3/1582; H02M 3/1584;
         H02M 2003/1557; H02M 1/0032; H02M
         1/4225; H02M 7/217; H02M 1/0025;
         H02M 1/0045; H05B 39/048; B23K
         11/24; H04B 2215/069
   See application file for complete search history.

INDUCTIVE-LOAD CONTROL CIRCUIT

CLAIM OF PRIORITY

This application claims benefit of Japanese Patent Application No. 2020-046528 filed on Mar. 17, 2020, which is hereby incorporated by reference in its entirety.

BACKGROUND OF THE INVENTION

1. Field of the Invention

The present invention relates to an inductive-load control circuit.

2. Description of the Related Art

A DC-DC converter is disclosed which includes an inductive load and is capable of detecting an amount of heat generated by a switching element and controlling the temperature of the entire device to be within a predetermined temperature range (for example, Japanese Unexamined Patent Application Publication No. 2009-89451).

Recent performance improvement and size reduction of electronic components make it more likely that heat from various heat sources is transferred to a ground pattern that allows close arrangement of an overcurrent detection resistor and a positive temperature coefficient (PTC) thermistor in the DC-DC converter disclosed in Japanese Unexamined Patent Application Publication No. 2009-89451. Consequently, the DC-DC converter fails to accurately detect the temperature of the inductive load.

SUMMARY OF THE INVENTION

Accordingly, for example, when the inductive load is an element, such as an electromagnetic brake or an electromagnetic clutch, that performs motive power control through electrically performed magnetic control, an inductive-load control circuit is desired which has a simple configuration and is capable of accurately detecting a temperature of the inductive load.

According to an aspect of an embodiment, an inductive-load control circuit includes a circuit board on or in which a controller and a driving circuit are disposed, an inductive load disposed at a location apart from the circuit board and connected to the driving circuit of the circuit board, a detection resistor group included in the driving circuit and connected in series with the inductive load, and a temperature measuring element. The detection resistor group includes a plurality of resistors, and the temperature measuring element is disposed between the plurality of resistors. The controller and the driving circuit are supplied with electric power by a power supply. The driving circuit controls the electric power supplied by the power supply and applies the electric power to the inductive load. The circuit board has a signal ground connected to the controller and a power ground connected to the detection resistor group of the driving circuit. The temperature measuring element is connected to the power ground.

The disclosed inductive-load control circuit has a simple configuration and is capable of accurately detecting a temperature of the inductive load.

DESCRIPTION OF THE PREFERRED EMBODIMENTS

An embodiment will be described blow. The same or substantially the same components or the like are denoted by the same reference sign to omit description thereof.

A control circuit for an inductive load (hereinafter, referred to as an inductive-load control circuit) when the inductive load is an electromagnetic brake will be described first with reference to FIG. 1.

Figure 1:
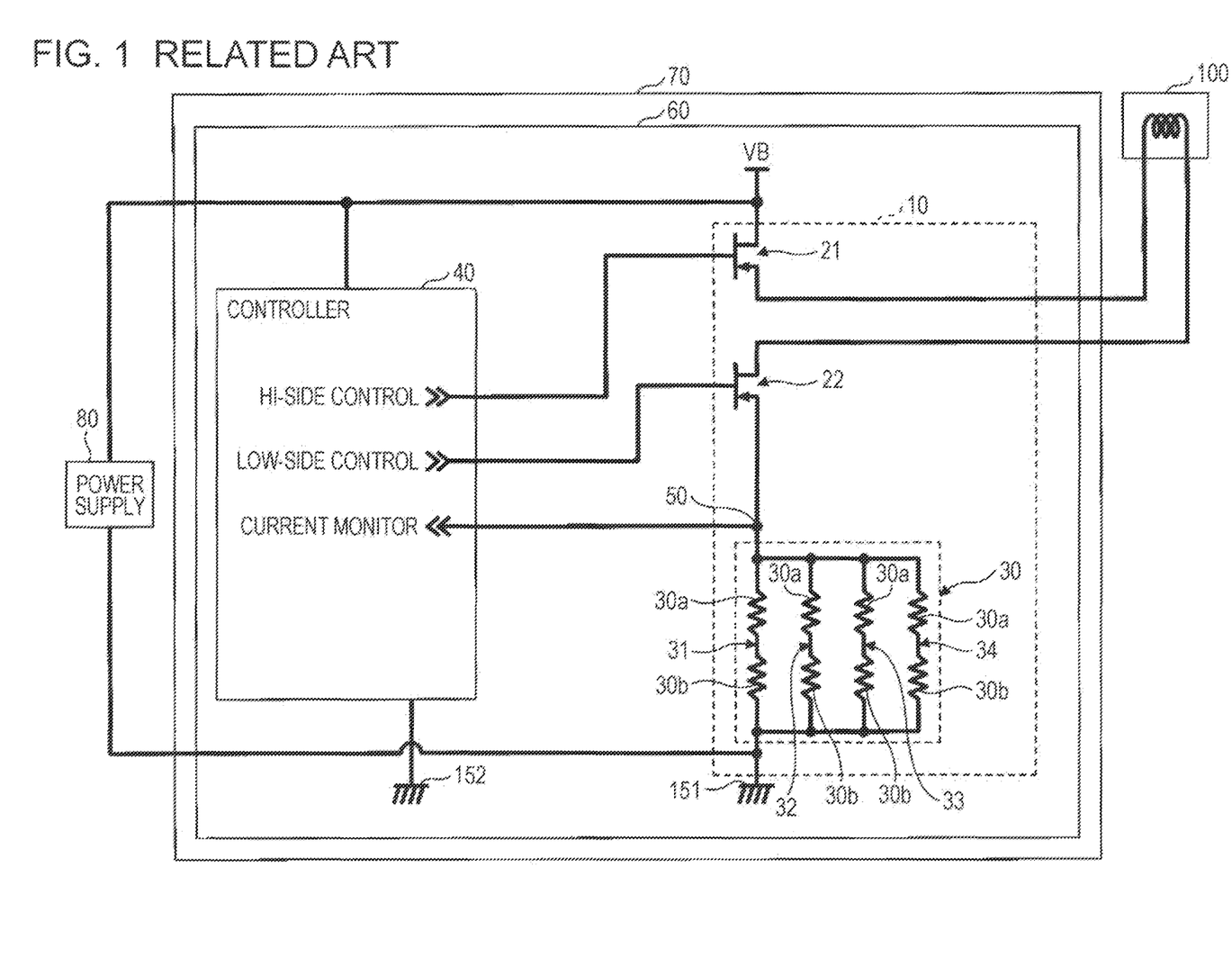
FIG. 1 is a diagram illustrating a configuration of an inductive-load control circuit when an inductive load is an electromagnetic brake.

The inductive-load control circuit illustrated in FIG. 1 controls a current that flows through an electromagnetic brake 100 which is an inductive load. In the embodiment, description will be given on the assumption that the electromagnetic brake 100 which is the inductive load is mounted in, but not limited to, a vehicle such as an automobile. The inductive-load control circuit includes a first field-effect transistor (FET) 21, a second FET 22, a detection resistor group 30, and a controller 40. In the inductive-load control circuit, the first FET 21, the second FET 22, and the detection resistor group 30 constitute a driving circuit 10. The first FET 21, the second FET 22, the detection resistor group 30, and the controller 40 are disposed on or in a circuit board 60. The circuit board 60 is housed in a housing 70. In the vehicle such as an automobile, the electromagnetic brake 100 is installed at a location that is outside the housing 70 and is apart from the housing 70 of the inductive-load control circuit. As a power supply 80 that supplies electric power to the circuit board 60, a power supply located outside a housing, such as a battery of the vehicle such as an automobile, is often used. In this example, the power supply 80 is also disposed outside the housing 70.

A drain of the first FET 21 is connected to a battery voltage VB. A source of the first FET 21 is connected to one of ends of the electromagnetic brake 100. A drain of the second FET 22 is connected to the other end of the electromagnetic brake 100. A source of the second FET 22 is connected to one of ends of the detection resistor group 30. The other end of the detection resistor group 30 is connected to a power ground (P-GND) 151. Thus, the electromagnetic brake 100 is electrically connected to the driving circuit 10 of the circuit board 60.

As illustrated in FIG. 1, the detection resistor group 30 includes, for example, a first resistor group 31, a second resistor group 32, a third resistor group 33, and a fourth resistor group 34 connected in parallel with each other. Each of the first resistor group 31, the second resistor group 32, the third resistor group 33, and the fourth resistor group 34 includes a first resistor 30a and a second resistor 30b connected in series with each other. In each of the first resistor group 31, the second resistor group 32, the third resistor group 33, and the fourth resistor group 34, the first resistor 30a is connected to a source side of the second FET 22 and the second resistor 30b is connected to the P-GND 151.

Gates of the first FET 21 and the second FET 22 are connected to the controller 40. A node 50 of the source of the second FET 22 and the one end of the detection resistor group 30 is connected to the controller 40.

In the inductive-load control circuit illustrated in FIG. 1, the controller 40 controls a voltage applied to the gates of the first FET 21 and the second FET 22, so that the first FET 21 and the second FET 22 turn on. Consequently, a current flows through the electromagnetic brake 100. The current that flows through the electromagnetic brake 100 also flows through the detection resistor group 30. Thus, by measuring a voltage at the node 50 of the source of the second FET 22 and the one end of the detection resistor group 30, the controller 40 can calculate and monitor the current that flows through the detection resistor group 30 and the electromagnetic brake 100. When an overcurrent exceeding a threshold flows through the electromagnetic brake 100, a protection circuit in the controller 40 functions to control the voltage applied to the gates of the first FET 21 and the second FET 22. In this manner, the controller 40 can stop the current flowing through the electromagnetic brake 100.

However, since the electromagnetic brake 100 has a low resistance, the electromagnetic brake 100 is a circuit where overcurrent easily occurs if current control is performed abnormally. For example, if a current of an overcurrent threshold or lower continuously flows through the electromagnetic brake 100 for a long time, the electromagnetic brake 100 may abnormally generate heat and catch fire. Accordingly, a method of directly measuring a temperature of the electromagnetic brake 100 is conceivable. However, the electromagnetic brake 100 is apart from the inductive-load control circuit. Installation of a thermistor near the electromagnetic brake 100 requires a long wire, connectors, and the like for connecting the thermistor and the inductive-load control circuit to each other. Consequently, the structure complicates and noise resistance decreases.

A method of installing a fuse in series with the electromagnetic brake 100 is also conceivable. In this case, if the fuse has a high temperature, the fuse blows to stop the current. However, the fuse needs to be replaced for recovery, which requires time and labor.

Since the electromagnetic brake 100 includes, for example, a copper coil, the resistance of the electromagnetic brake 100 changes if the temperature thereof increases. Thus, a method of measuring the resistance of the electromagnetic brake 100 is also conceivable. However, this method additionally requires a device for measuring a resistance.

Therefore, an inductive-load control circuit is desired which has a simple configuration and is capable of detecting a temperature of the electromagnetic brake 100 and preventing the electromagnetic brake 100 from catching fire.

Inductive-Load Control Circuit

In the inductive-load control circuit illustrated in FIG. 1, the current that flows through the electromagnetic brake 100 also flows through the detection resistor group 30. Thus, when the electromagnetic brake 100 generates heat because of the current flowing through the electromagnetic brake 100, the temperature of the detection resistor group 30 increases more quickly than the temperature of the electromagnetic brake 100. The reason for this is as follows. The electromagnetic brake 100 includes a coil and a magnetic yoke. Since the electromagnetic brake 100 has a larger heat capacity than chip resistors located on the circuit board 60, the temperature change takes a long time. Therefore, the temperature increases more quickly in the detection resistor group 30 than in the electromagnetic brake 100. The resistance value of the combined resistance of the detection resistor group 30 is greater than or equal to 0.01Ω and is less than or equal to 1Ω. With such a resistance value range, heat generated by the detection resistor group 30 can be adjusted so that the temperature does not exceed the rated temperature of a neighboring component. Since the circuit of the electromagnetic brake 100 can be designed to be have a small system resistance, the responsivity of the electromagnetic brake 100 can also be ensured.

An inductive-load control circuit according to the embodiment measures a temperature at a detection resistor group 30 to predict a temperature of an electromagnetic brake 100. If the temperature at the detection resistor group 30 exceeds a predetermined threshold, the inductive-load control circuit performs control to stop a current flowing through the electromagnetic brake 100. In this manner, the inductive-load control circuit can prevent the electromagnetic brake 100 from catching fire.

The inductive-load control circuit according to the embodiment will be described next with reference to FIGS. 2 and 3. The inductive-load control circuit according to the embodiment controls a current that flows through the electromagnetic brake 100 which is an inductive load.

The inductive-load control circuit according to the embodiment includes a first FET 21, a second FET 22, the detection resistor group 30, a thermistor 130, and a controller 40. The first FET 21, the second FET 22, the detection resistor group 30, and the thermistor 130 constitute a driving circuit 110. The first FET 21, the second FET 22, the detection resistor group 30, the thermistor 130, and the controller 40 are disposed on or in a circuit board 160. The circuit board 160 is housed in a housing 170. In a vehicle such as an automobile, the electromagnetic brake 100 is installed at a location that is outside the housing 170 and is apart from the housing 170 of the inductive-load control circuit. As a power supply 80 that supplies electric power to the circuit board 160, a battery of the vehicle such as an automobile is often used. Thus, the power supply 80 is disposed outside the housing 170. Herein, the thermistor 130 is also referred to as a temperature measuring element.

Figure 3:
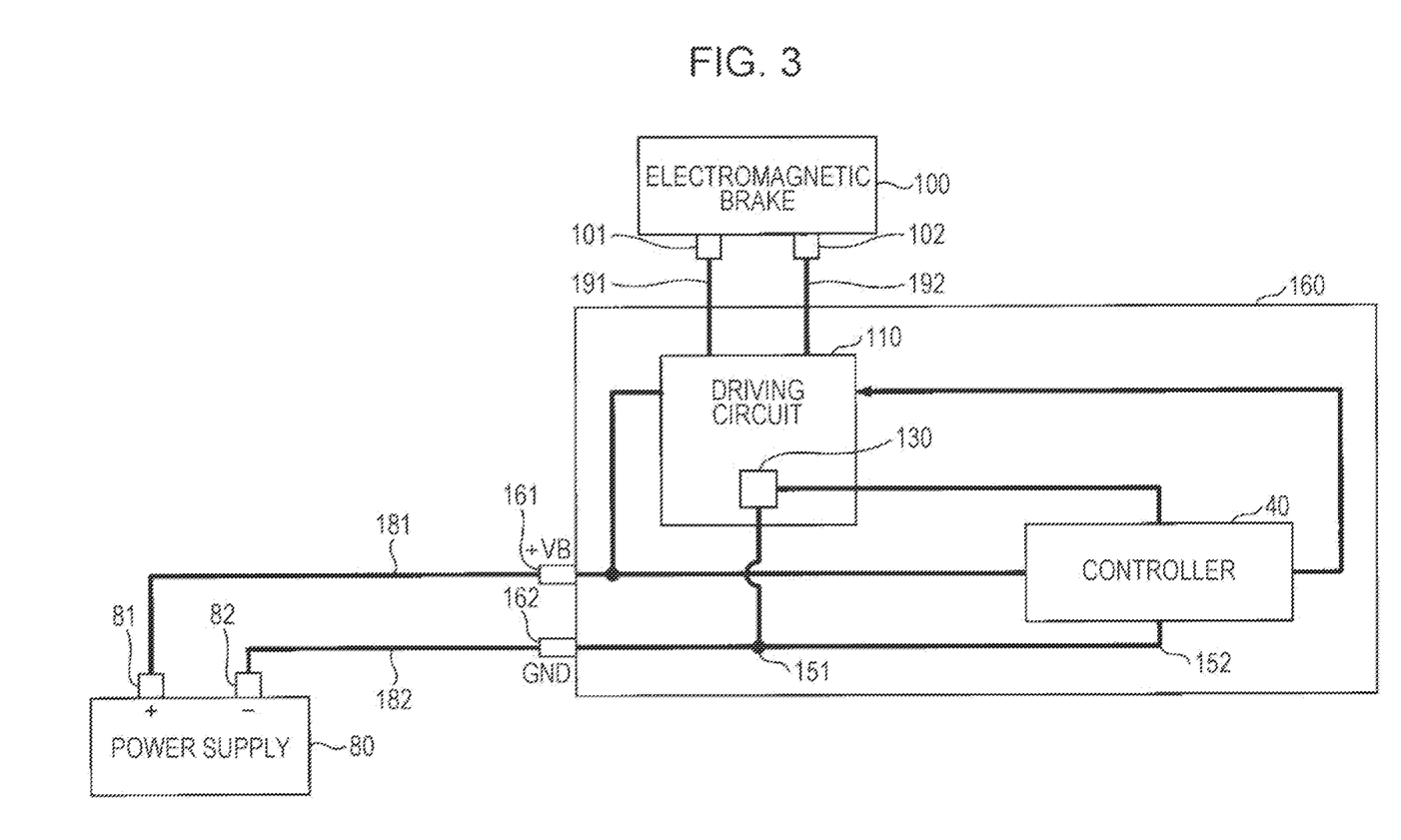
FIG. 3 is a block diagram of the inductive-load control circuit according to the embodiment.

FIG. 3 is a block diagram of the inductive-load control circuit according to the embodiment. As illustrated in FIG. 3, the power supply 80 and the circuit board 160 are connected to each other through connectors. The circuit board 160 and the electromagnetic brake 100 are connected to each other through connectors. Specifically, the power supply 80, which is a battery, have connectors 81 and 82. The connectors 81 and 82 are connected to connectors 161 and 162 of the circuit board 160 by wires 181 and 182, respectively. Thus, electric power is supplied to the circuit board 160 by the power supply 80. The electromagnetic brake 100 located at a location apart from the circuit board 160 have connectors 101 and 102, to which wires 191 and 192 connected to the driving circuit 110 of the circuit board 160 are respectively connected. Thus, the electromagnetic brake 100 is electrically connected to the driving circuit 110 of the circuit board 160, and the power supply 80 is electrically connected to the wires of the circuit board 160.

In the inductive-load control circuit according to the embodiment, the circuit board 160 has a power ground (P-GND) 151 and a signal ground (S-GND) 152. A ground (GND) of the power supply 80 is connected to the circuit board 160 and branches into the P-GND 151 and the S-GND 152 in the circuit board 160. The controller 40 is connected to the S-GND 152. The detection resistor group 30 is connected to the P-GND 151 as illustrated in FIG. 2.

Figure 2:
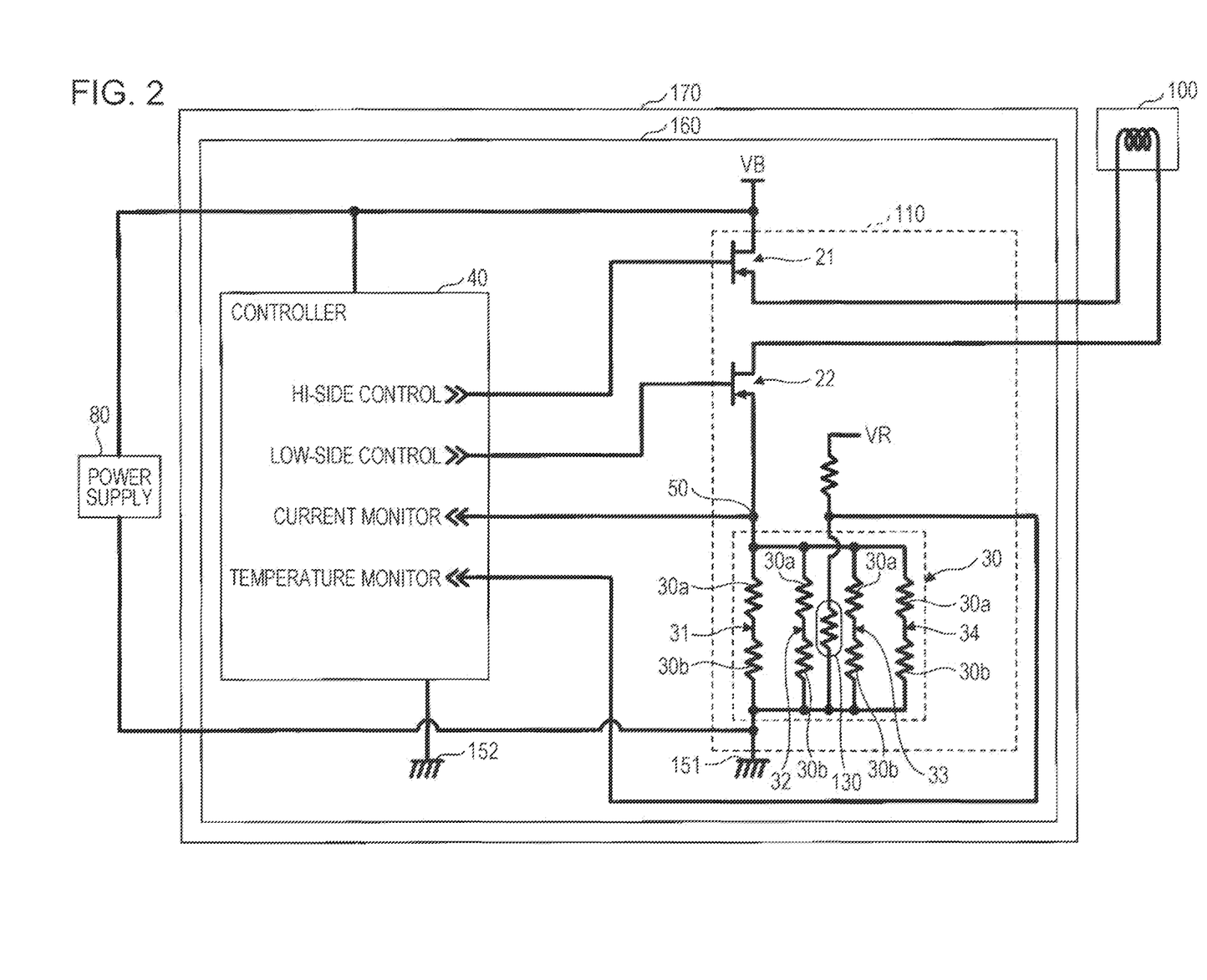
FIG. 2 is a diagram illustrating a configuration of an inductive-load control circuit according to an embodiment.

As illustrated in FIG. 2, the detection resistor group 30 includes, for example, a first resistor group 31, a second resistor group 32, a third resistor group 33, and a fourth resistor group 34 connected in parallel with each other. The thermistor 130 for measuring a temperature is disposed between the second resistor group 32 and the third resistor group 33.

Figure 4:
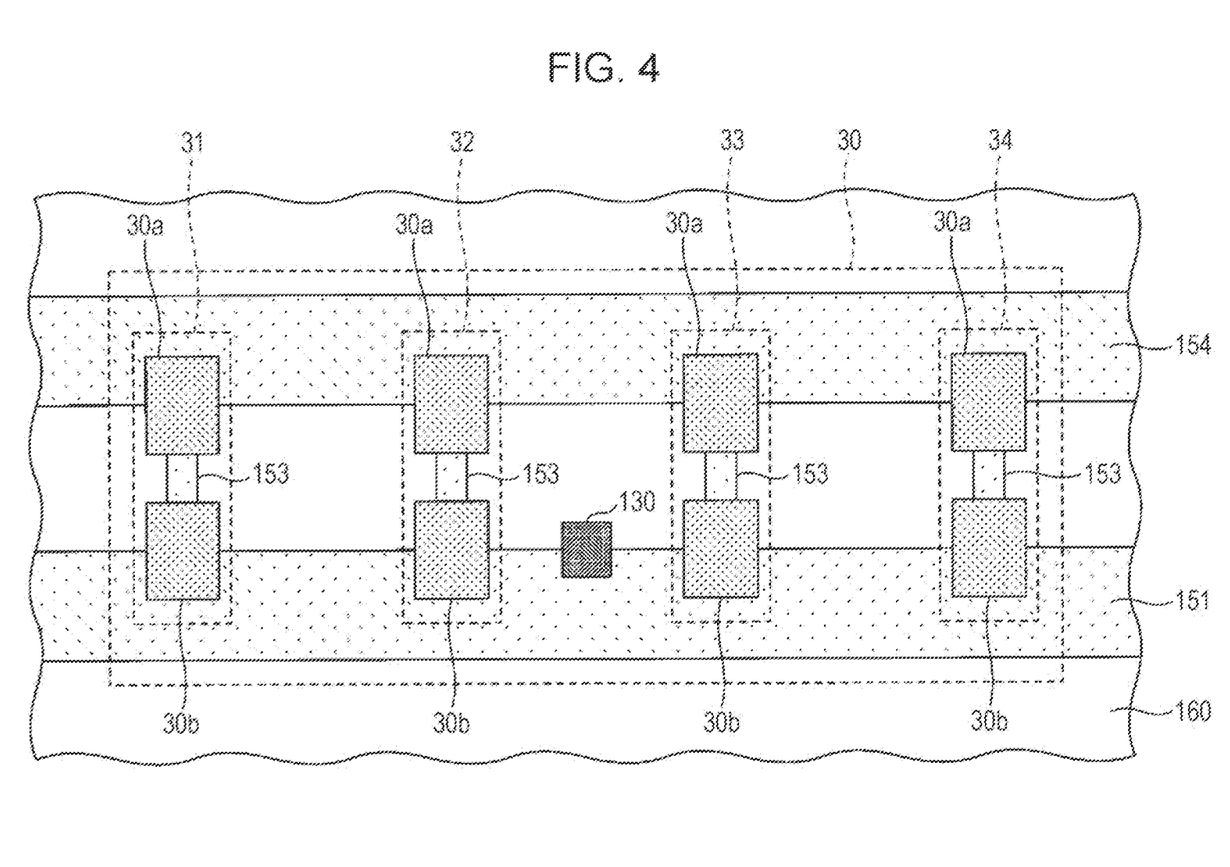
FIG. 4 is a schematic diagram of the inductive-load control circuit according to the embodiment.

FIG. 4 is an enlarged view of a portion where the detection resistor group 30 is disposed in the inductive-load control circuit according to the embodiment. The P-GND 151 and an electromagnetic-brake-side wire 154 that extends from the electromagnetic brake 100 and is connected to a source of the second FET 22 are formed as copper wiring patterns on a surface of the circuit board 160.

One of ends of the detection resistor group 30 is connected to the electromagnetic-brake-side wire 154. The other end of the detection resistor group 30 is connected to the P-GND 151. More specifically, each of the first resistor group 31, the second resistor group 32, the third resistor group 33, and the fourth resistor group 34 of the detection resistor group 30 is disposed between the electromagnetic-brake-side wire 154 and the P-GND 151. Each of the first resistor group 31, the second resistor group 32, the third resistor group 33, and the fourth resistor group 34 includes a first resistor 30a and a second resistor 30b which are chip components. The first resistor 30a and the second resistor 30b are connected in series with each other by a connection wire 153. Thus, one of terminals of the first resistor 30a is connected to the electromagnetic-brake-side wire 154. The other terminal of the first resistor 30a and one of terminals of the second resistor 30b are connected to each other by the connection wire 153. The other terminal of the second resistor 30b is connected to the P-GND 151.

In the case illustrated in FIG. 4, the thermistor 130, which is a chip component, is disposed on the P-GND 151 between the second resistor 30b of the second resistor group 32 and the second resistor 30b of the third resistor group 33 in the detection resistor group 30.

If a current of a predetermined value or greater flows through the first resistors 30a and the second resistors 30b of the detection resistor group 30 for a long time, temperatures of the first resistors 30a and the second resistors 30b increase. However, heat generated by the first resistors 30a and the second resistors 30b is transferred to the electromagnetic-brake-side wire 154 and the P-GND 151 which are composed of copper having a high thermal conductivity. The thermistor 130 is connected to the GND, and is used in this state. If the thermistor 130 is disposed on the P-GND 151 to which heat generated by the first resistors 30a and the second resistors 30b is transferred, early and accurate detection of a temperature change caused by the generated heat is implemented. Therefore, to recognize generation of heat by the detection resistor group 30 for sure, the thermistor 130 is preferably disposed between a plurality of resistors that constitute the detection resistor group 30.

In the embodiment, the circuit board 160 has the P-GND 151 and the S-GND 152. The thermistor 130 is connected to the P-GND 151. The controller 40, which is a central processing unit (CPU) or the like, generates heat during operation. A portion to which the thermistor 130 is connected in the P-GND 151 is apart from a portion to which the controller 40 is connected in the S-GND 152. Thus, heat generated by the controller 40 does not affect the temperature detected by the thermistor 130. Therefore, the thermistor 130 can recognize generation of heat by the detection resistor group 30 more accurately.

The detection resistor group 30 including four resistor groups, i.e., the first resistor group 31, the second resistor group 32, the third resistor group 33, and the fourth resistor group 34, is described in the embodiment. However, it is sufficient that the detection resistor group 30 includes two or more resistor groups. The thermistor 130 may be disposed near the detection resistor group 30. However, the thermistor 130 is preferably disposed between a plurality of register groups in the detection resistor group 30. The first resistor group 31, the second resistor group 32, the third resistor group 33, and the fourth resistor group 34 in each of which two resistors are connected in series with each other are described. However, each of the first resistor group 31, the second resistor group 32, the third resistor group 33, and the fourth resistor group 34 may include a single resistor.

Modifications

Figure 5:
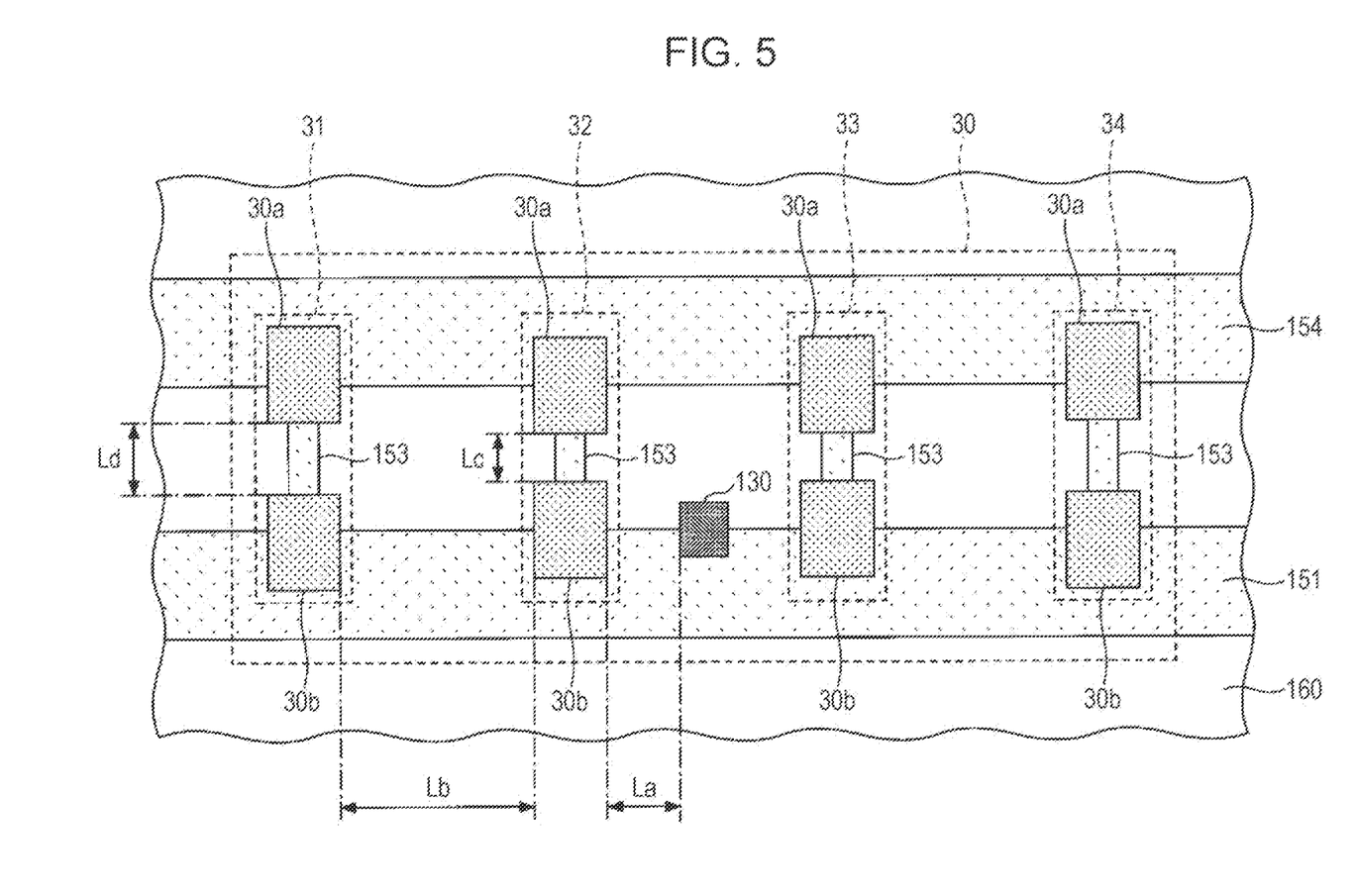
FIG. 5 is a schematic diagram of an inductive-load control circuit according to a modification of the embodiment.

As illustrated in FIG. 5, in the inductive-load control circuit according to the embodiment, a space La between the thermistor 130 and the second resistor 30b closest to the thermistor 130 may be smaller than a space Lb between the second resistors 30b adjacent to each other. That is, the space La between the thermistor 130 and the second resistor 30b of the second resistor group 32 closest to the thermistor 130 may be narrower than the space Lb between the second resistors 30b of the first and second resistor groups 31 and 32 adjacent to each other. Since heat is more easily dissipated if the space between the second resistors 30b is increased, the temperature at a portion where the thermistor 130 is disposed can be made higher than the temperature at the other portions. For example, the space Lb may be twice as large as the space La. This modification is applied to a case where the detection resistor group 30 includes three or more resistor groups.

A space Lc between the first resistor 30a and the second resistor 30b of the second resistor group 32 closest to the thermistor 130 may be narrower than a space Ld between the first resistor 30a and the second resistor 30b of the first resistor group 31 adjacent to the second resistor group 32. Also in this case, the temperature at a portion where the thermistor 130 is disposed can be made higher than the temperature at the other portions. For example, the space Ld may be twice as large as the space Lc.

Heat generated as a result of a current flowing through the first resistors 30a and the second resistors 30b (of the detection resistor group 30) is transferred to and dissipated from the connection wires 153, the electromagnetic-brake-side wire 154, and the P-GND 151. Thus, as the distance between the resistors which are heat generation sources increases, heat dissipation characteristics improve and the temperatures of elements decrease. Thus, the connection wires 153, the electromagnetic-brake-side wire 154, and the P-GND 151 are effective as a heat dissipation measure. On the other hand, when an overcurrent flows through the first resistors 30a and the second resistors 30b, abnormal heat generation needs to be detected before a circuit component fails because of the generated heat. Therefore, the thermistor 130 is desirably disposed as close to the first resistor 30a and the second resistor 30b, which are heat sources, as possible. In view of such requirements, by setting the space La smaller than the space Lb and setting the space Lc smaller than the space Ld, the good sensitivity and responsivity of the thermistor 130 to abnormal heat generation as well as the heat dissipation measure can be ensured.

While the embodiment has been described in detail above, the present invention is not limited to a particular embodiment, and various modifications and alterations can be made within the scope described in the claims.

What is claimed is:

1. An inductive-load control circuit comprising:
   a circuit board on or in which a controller and a driving circuit are disposed;

an inductive load disposed at a location apart from the circuit board and connected to the driving circuit of the circuit board;
a detection resistor group included in the driving circuit and connected in series with the inductive load; and
a temperature measuring element, wherein
the detection resistor group includes a plurality of resistors, and the temperature measuring element is disposed between the plurality of resistors,
the controller and the driving circuit are supplied with electric power by a power supply,
the driving circuit controls the electric power supplied by the power supply and applies the electric power to the inductive load,
the circuit board has a signal ground connected to the controller and a power ground connected to the detection resistor group of the driving circuit, and
the temperature measuring element is connected to the power ground.

2. The inductive-load control circuit according to claim 1, wherein
the detection resistor group includes a plurality of resistor groups connected in parallel with each other, and
the temperature measuring element is disposed between the plurality of resistor groups.

3. The inductive-load control circuit according to claim 2, wherein
each of the plurality of resistor groups includes a plurality of resistors connected in series with each other.

4. The inductive-load control circuit according to claim 2, wherein
the plurality of resistor groups include three or more resistor groups connected in parallel with each other, and
a space between the temperature measuring element and a resistor of a resistor group closest to the temperature measuring element among the three or more resistor groups is smaller than a space between resistors of resistor groups adjacent to each other among the three or more resistor groups.

5. The inductive-load control circuit according to claim 1, wherein
the detection resistor group has a resistance value that is greater than or equal to 0.01Ω and is less than or equal to 1 Ω.

6. The inductive-load control circuit according to claim 1, wherein
the temperature measuring element is a thermistor.

7. The inductive-load control circuit according to claim 1, wherein
the circuit board has a wiring pattern connected to the power ground, and
the temperature measuring element is disposed on the wiring pattern.

8. An inductive-load control circuit comprising:
a circuit board on or in which a controller and a driving circuit are disposed;
an inductive load disposed at a location apart from the circuit board and connected to the driving circuit of the circuit board;
a detection resistor group included in the driving circuit and connected in series with the inductive load; and
a temperature measuring element, wherein
the detection resistor group includes a plurality of resistors, and the temperature measuring element is disposed between the plurality of resistors,
the controller and the driving circuit are supplied with electric power by a power supply,
the driving circuit controls the electric power supplied by the power supply and applies the electric power to the inductive load,
the circuit board has a signal ground connected to the controller and a power ground connected to the detection resistor group of the driving circuit,
the temperature measuring element is connected to the power ground,
the temperature measuring element is connected to a regulated voltage via another resistor, and a value of the regulated voltage is different from a value of the electric power supplied by the power supply, and
a node connecting between the temperature measuring element and the another resistor is connected to the controller.

9. The inductive-load control circuit according to claim 8, wherein
the detection resistor group includes a plurality of resistor groups connected in parallel with each other, and
the temperature measuring element is disposed between the plurality of resistor groups.

10. The inductive-load control circuit according to claim 9, wherein
each of the plurality of resistor groups includes a plurality of resistors connected in series with each other.

11. The inductive-load control circuit according to claim 9, wherein
the plurality of resistor groups include three or more resistor groups connected in parallel with each other, and
a space between the temperature measuring element and a resistor of a resistor group closest to the temperature measuring element among the three or more resistor groups is smaller than a space between resistors of resistor groups adjacent to each other among the three or more resistor groups.

12. The inductive-load control circuit according to claim 8, wherein
the detection resistor group has a resistance value that is greater than or equal to 0.01Ω and is less than or equal to 1Ω.

13. The inductive-load control circuit according to claim 8, wherein
the temperature measuring element is a thermistor.

14. The inductive-load control circuit according to claim 8, wherein
the circuit board has a wiring pattern connected to the power ground, and
the temperature measuring element is disposed on the wiring pattern.

* * * * *